US011893716B2

(12) United States Patent
Watazawa

(10) Patent No.: US 11,893,716 B2
(45) Date of Patent: Feb. 6, 2024

(54) IMAGE PROCESSING APPARATUS AND IMAGE PROCESSING METHOD, AND IMAGE CAPTURING APPARATUS

(71) Applicant: CANON KABUSHIKI KAISHA, Tokyo (JP)

(72) Inventor: Naoko Watazawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 335 days.

(21) Appl. No.: 17/367,657

(22) Filed: Jul. 6, 2021

(65) Prior Publication Data

US 2021/0344846 A1 Nov. 4, 2021

Related U.S. Application Data

(63) Continuation of application No. 16/804,197, filed on Feb. 28, 2020, now Pat. No. 11,089,236.

(30) Foreign Application Priority Data

Mar. 6, 2019 (JP) ................. 2019-040881

(51) Int. Cl.
*G06T 5/00* (2006.01)
*G06T 7/50* (2017.01)
*G06F 18/211* (2023.01)
*H04N 23/76* (2023.01)
*G06V 10/141* (2022.01)
*G06V 10/60* (2022.01)
(Continued)

(52) U.S. Cl.
CPC ............ *G06T 5/008* (2013.01); *G06F 18/211* (2023.01); *G06T 5/00* (2013.01); *G06T 7/50* (2017.01); *G06V 10/141* (2022.01); *G06V 10/145* (2022.01); *G06V 10/60* (2022.01); *G06V 40/166* (2022.01); *H04N 23/76* (2023.01); *G06T 2207/20104* (2013.01); *G06T 2207/30201* (2013.01)

(58) Field of Classification Search
CPC .. G06T 5/008; G06T 7/50; G06T 5/00; G06V 10/141; G06V 10/60; G06V 40/166; G06V 10/145; H04N 23/76; G06F 18/211
USPC ....................................................... 348/135
See application file for complete search history.

(56) References Cited

U.S. PATENT DOCUMENTS

| 2007/0046665 A1 | 3/2007 | Nakagawa et al. |
| 2012/0093418 A1 | 4/2012 | Kim et al. |
| 2013/0259307 A1 | 10/2013 | Torii et al. |

(Continued)

FOREIGN PATENT DOCUMENTS

JP 2016-072694 A 5/2016

*Primary Examiner* — Jeffery A Williams
*Assistant Examiner* — Kristin Dobbs
(74) *Attorney, Agent, or Firm* — Venable LLP

(57) ABSTRACT

An image processing apparatus comprises: an acquisition unit that acquires a first image obtained through shooting and distance information of the first image; a detection unit that detects a main subject from the first image; an extraction unit that extracts another subject from the first image based on the distance information of the main subject; a setting unit that sets parameters of one or more virtual light sources that emit virtual light to the main subject and the extracted other subject; and a processing unit that generates from the first image a second image in which the main subject and the other subject are illuminated with the virtual light using the parameters set by the setting unit.

12 Claims, 15 Drawing Sheets

(51) Int. Cl.
    *G06V 10/145*    (2022.01)
    *G06V 40/16*     (2022.01)

(56) References Cited

U.S. PATENT DOCUMENTS

| | | |
|---|---|---|
| 2014/0125784 A1 | 5/2014 | Fukazawa et al. |
| 2014/0313365 A1 | 10/2014 | Lehtiniemi et al. |
| 2015/0222780 A1 | 8/2015 | Lee et al. |
| 2015/0242683 A1 | 8/2015 | Tang et al. |
| 2016/0012642 A1 | 1/2016 | Lee et al. |
| 2017/0244882 A1 | 8/2017 | Kitajima |
| 2017/0251136 A1* | 8/2017 | Ogino .................... H04N 23/74 |

* cited by examiner

FIG. 7A
FIG. 7B
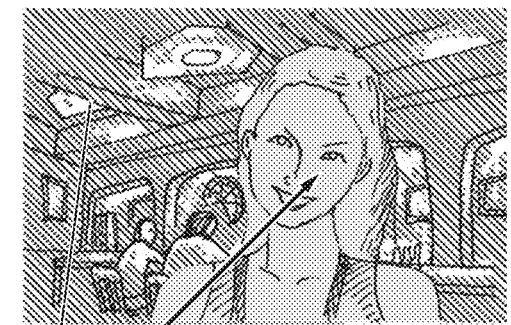
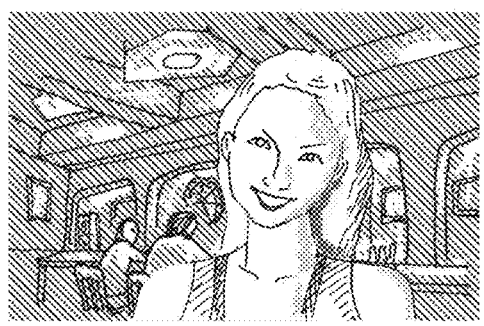

IMAGE PROCESSING APPARATUS AND IMAGE PROCESSING METHOD, AND IMAGE CAPTURING APPARATUS

This application is a continuation of application Ser. No. 16/804,197 filed Feb. 28, 2020.

BACKGROUND OF THE INVENTION

Field of the Invention

The present invention relates to an image processing apparatus, an image processing method, and an image capturing apparatus, and more particularly to a technique for correcting brightness of an input image.

Description of the Related Art

Conventionally, there has been known as a relighting processing a technique of irradiating a subject in a captured image with light from a virtual light source. The relighting process makes it possible to brighten a dark area such as a shadow caused by ambient light and obtain a preferable image.

For example, Japanese Patent Laid-Open No. 2016-72694 discloses a relighting processing capable of appropriately correcting the state of a shadow of a subject. Specifically, the state of the shadow in a predetermined area of the captured image is detected, and the characteristics of the virtual light source are determined based on the detected state of the shadow. Then, the captured image is corrected so as to be in a shaded state when virtual light is emitted from a virtual light source having the determined characteristics.

However, in the method described in Japanese Patent Laid-Open No. 2016-72694, the state of the shadow of the detected subject is detected, and the characteristics of the virtual light source suitable for the subject are determined. Therefore, the relighting processing is performed on the detected subject, but the relighting processing is not performed on the undetected subject. For example, in the case of subject detection using human face detection, there is a problem in that relighting processing is not performed on subjects other than persons whose faces are detected.

Hereinafter, a specific example will be described for explanation. FIG. 15A shows an example of an image in which a person and a dog exist, and both the person and the dog are assumed to be dark. On such an image, when virtual light is emitted only to a person detected by face detection as shown in FIG. 15B, the reflection component of the virtual light makes only the person bright as shown in FIG. 15C. Therefore, a result of the relighting processing exhibits an unnatural image, as shown in FIG. 15D, such that only the person becomes bright, and the dog next to the person remains dark.

SUMMARY OF THE INVENTION

The present invention has been made in consideration of the above situation, and reduces unnaturalness in a result of the relighting processing in a scene where a scene to be processed includes a subject detected by subject detection and a subject not detected by subject detection.

According to the present invention, provided is an image processing apparatus comprising: an acquisition unit that acquires a first image obtained through shooting and distance information of the first image; a detection unit that detects a main subject from the first image; an extraction unit that extracts another subject from the first image based on the distance information of the main subject; a setting unit that sets parameters of one or more virtual light sources that emit virtual light to the main subject and the extracted other subject; and a processing unit that generates from the first image a second image in which the main subject and the other subject are illuminated with the virtual light using the parameters set by the setting unit, wherein each unit is implemented by one or more processors, circuitry or a combination thereof.

Further, according to the present invention, provided is an image capturing apparatus comprising: an image sensing unit that shoots a subject and outputs a first image, and an image processing apparatus that includes an acquisition unit that acquires the first image obtained through shooting and distance information of the first image; a detection unit that detects a main subject from the first image; an extraction unit that extracts another subject from the first image based on the distance information of the main subject; a setting unit that sets parameters of one or more virtual light sources that emit virtual light to the main subject and the extracted other subject; and a processing unit that generates from the first image a second image in which the main subject and the other subject are illuminated with the virtual light using the parameters set by the setting unit, wherein each unit is implemented by one or more processors, circuitry or a combination thereof.

Furthermore, according to the present invention, provided is an image processing apparatus comprising: an acquisition unit that acquires an image obtained through shooting and distance information of the image; a detection unit that detects a specific subject from the image; and a processing unit that adds an effect of virtual light illuminating at least a partial area of the image to the image, wherein, in a case where the effect of the virtual light is added by the processing unit to the image including a first subject which can be detected by the detection unit and a second subject which cannot be detected by the detection unit, if a difference between a distance to the first subject and a distance to the second subject is a first value, the processing unit adds an effect of the virtual light illuminating the first subject and the second subject, and if the difference between the distance to the first subject and the distance to the second subject is a second value that is greater than the first value, the processing unit adds an effect of the virtual light illuminating the first subject, and does not add an effect of the virtual light illuminating the second subject, and wherein each unit is implemented by one or more processors, circuitry or a combination thereof.

Further, according to the present invention, provided is an image processing apparatus comprising: an acquisition unit that acquires an image obtained through shooting and distance information of the image; a processing unit that adds an effect of virtual light illuminating at least a partial area of the image to the image, and a selection unit that selects a specific subject from the image in accordance with a user operation, wherein, in the image including a first subject and a second subject, in a case where the first subject is selected by the selection unit and an effect of the virtual light is to be added, if a difference between a distance to the first subject and a distance to the second subject is a first value, the processing unit adds an effect of the virtual light illuminating the first subject and the second subject, and if the difference between the distance to the first subject and the distance to the second subject is a second value that is greater than the first value, the processing unit adds an effect of the virtual light illuminating the first subject, and does not add an effect of the virtual light illuminating the second subject, and wherein each unit is implemented by one or more processors, circuitry or a combination thereof.

Further, according to the present invention, provided is an image processing method comprising: acquiring a first image obtained through shooting and distance information of the first image; detecting a main subject from the first image; extracting another subject from the first image based on the distance information of the main subject; setting parameters of one or more virtual light sources that emit virtual light to the main subject and the extracted other subject; and generating from the first image a second image in which the main subject and the other subject are illuminated with the virtual light using the set parameters.

Further, according to the present invention, provided is a non-transitory computer-readable storage medium, the storage medium storing a program that is executable by the computer, wherein the program includes program code for causing the computer to function as an image processing apparatus comprising: an acquisition unit that acquires a first image obtained through shooting and distance information of the first image; a detection unit that detects a main subject from the first image; an extraction unit that extracts another subject from the first image based on the distance information of the main subject; a setting unit that sets parameters of one or more virtual light sources that emit virtual light to the main subject and the extracted other subject; and a processing unit that generates from the first image a second image in which the main subject and the other subject are illuminated with the virtual light using the parameters set by the setting unit.

Further, according to the present invention, provided is an image processing method comprising: acquiring an image obtained through shooting and distance information of the image; detecting a predetermined subject from the image; and adding an effect of virtual light illuminating at least a partial area of the image to the image, wherein, in a case where the effect of the virtual light is added to the image including a first subject which can be detected in the detecting step and a second subject which cannot be detected in the detection step, if a difference between a distance to the first subject and a distance to the second subject is a first value, an effect of the virtual light illuminating the first subject and the second subject is added to the image, and if the difference between the distance to the first subject and the distance to the second subject is a second value that is greater than the first value, an effect of the virtual light illuminating the first subject is added to the image, and an effect of the virtual light illuminating the second subject is not added to the image.

Further, according to the present invention, provided is a non-transitory computer-readable storage medium, the storage medium storing a program that is executable by the computer, wherein the program includes program code for causing the computer to function as an image processing apparatus comprising: an acquisition unit that acquires an image obtained through shooting and distance information of the image; a detection unit that detects a specific subject from the image; and a processing unit that adds an effect of virtual light illuminating at least a partial area of the image to the image, wherein, in a case where the effect of the virtual light is added by the processing unit to the image including a first subject which can be detected by the detection unit and a second subject which cannot be detected by the detection unit, if a difference between a distance to the first subject and a distance to the second subject is a first value, the processing unit adds an effect of the virtual light illuminating the first subject and the second subject, and if the difference between the distance to the first subject and the distance to the second subject is a second value that is greater than the first value, the processing unit adds an effect of the virtual light illuminating the first subject, and does not add an effect of the virtual light illuminating the second subject.

Further, according to the present invention, provided is an image processing method comprising: acquiring an image obtained through shooting and distance information of the image; adding an effect of virtual light illuminating at least a partial area of the image to the image, and selecting a specific subject from the image in accordance with a user operation, wherein, in the image including a first subject and a second subject, in a case where the first subject is selected in the selecting step and an effect of the virtual light is to be added, if a difference between a distance to the first subject and a distance to the second subject is a first value, an effect of the virtual light illuminating the first subject and the second subject is added to the image, and if the difference between the distance to the first subject and the distance to the second subject is a second value that is greater than the first value, an effect of the virtual light illuminating the first subject is added to the image, and an effect of the virtual light illuminating the second subject is not added to the image.

Further, according to the present invention, provided is a non-transitory computer-readable storage medium, the storage medium storing a program that is executable by the computer, wherein the program includes program code for causing the computer to function as an image processing apparatus comprising: an acquisition unit that acquires an image obtained through shooting and distance information of the image; a processing unit that adds an effect of virtual light illuminating at least a partial area of the image to the image; and a selection unit that selects a specific subject from the image in accordance with a user operation, wherein, in the image including a first subject and a second subject, in a case where the first subject is selected by the selection unit and an effect of the virtual light is to be added, if a difference between a distance to the first subject and a distance to the second subject is a first value, the processing unit adds an effect of the virtual light illuminating the first subject and the second subject, and if the difference between the distance to the first subject and the distance to the second subject is a second value that is greater than the first value, the processing unit adds an effect of the virtual light illuminating the first subject, and does not add an effect of the virtual light illuminating the second subject.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIGS. 7A and 7B are views showing examples of images before and after relighting processing according to the embodiment;

DESCRIPTION OF THE EMBODIMENTS

Figure 1:
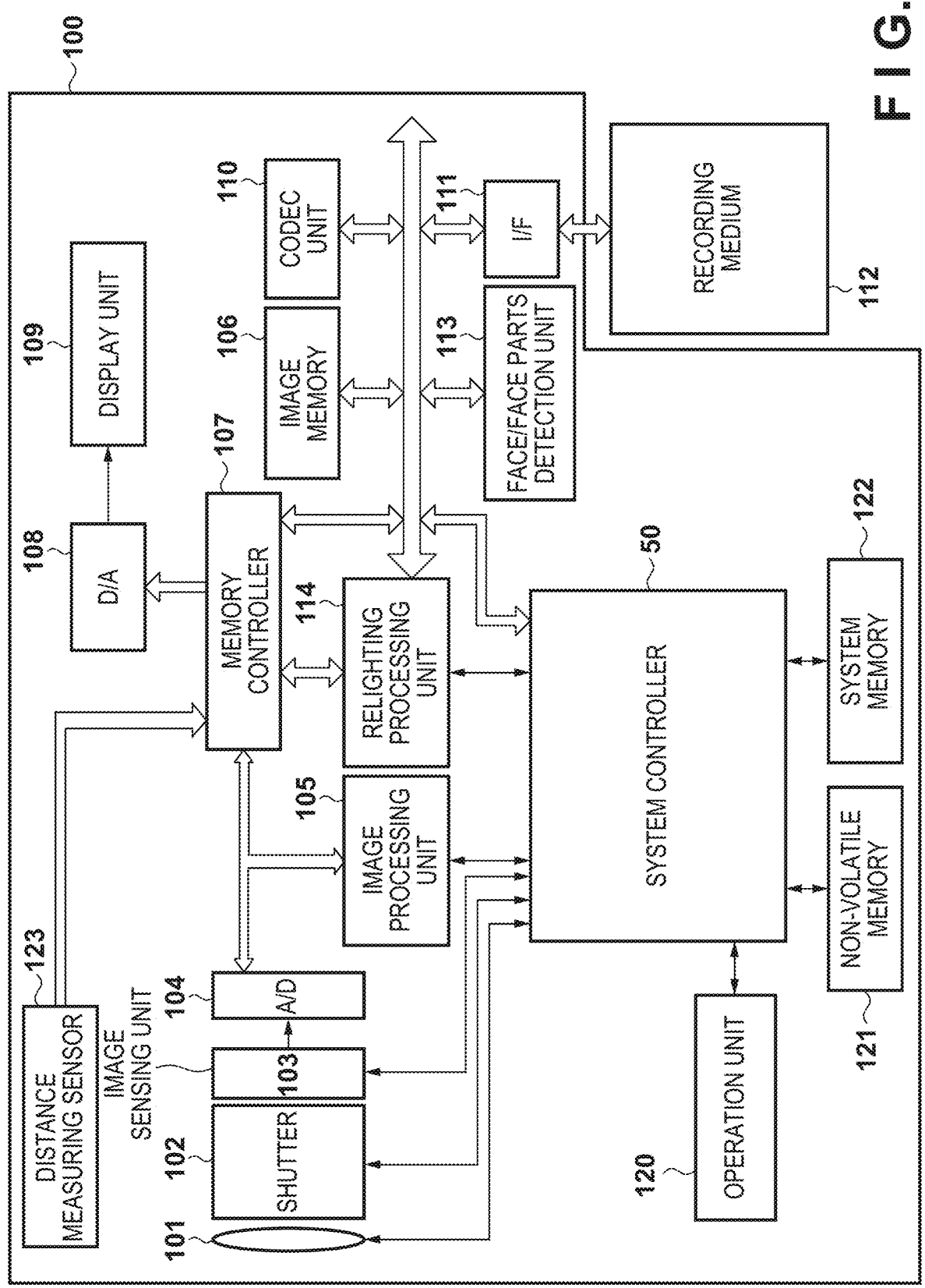
FIG. 1 is a block diagram showing a configuration of a digital camera according to an embodiment of the present invention.

Hereinafter, embodiments will be described in detail with reference to the attached drawings. Note, the following embodiments are not intended to limit the scope of the claimed invention, and limitation is not made an invention that requires a combination of all features described in the embodiments. Two or more of the multiple features described in the embodiments may be combined as appropriate. Furthermore, the same reference numerals are given to the same or similar configurations, and redundant description thereof is omitted.

In this embodiment, an example in which the present invention is applied to a digital camera as an image capturing apparatus will be described.

First Embodiment

FIG. 1 is a block diagram showing a configuration of a digital camera 100 according to an embodiment of the present invention. In the digital camera 100 shown in FIG. 1, light entering via a lens group 101 (imaging optical system) including a zoom lens and a focus lens and a shutter 102 having an aperture stop function is photoelectrically converted in an imaging unit 103. The imaging unit 103 is configured by a CCD, a CMOS sensor, or the like, and an electric signal obtained by photoelectric conversion is outputted to an A/D converter 104 as an image signal. The A/D converter 104 converts an analog image signal output from the imaging unit 103 into a digital image signal (image data) and outputs the digital image signal (image data) to the image processing unit 105.

The image processing unit 105 performs various image processing including color conversion processing such as white balance processing, γ processing, contour enhancement processing, and color correction processing on the image data from the A/D converter 104 or the image data read out from an image memory 106 via a memory controller 107. The image data output from the image processing unit 105 is written to the image memory 106 via the memory controller 107. The image memory 106 stores image data output from the image processing unit 105 and image data to be displayed on a display unit 109.

A face/face parts detection unit 113 detects a face and face-part region where a human face and face parts exist in a captured image, and outputs face size and face position information of the subject.

The image processing unit 105 performs a predetermined evaluation value calculation process using the result of the face detection and the result of the face-part detection by the face/face parts detection unit 113 and the captured image data, and a system controller 50 performs exposure control and focus control using the obtained evaluation values. In this manner, through-the-lens auto focus (AF) processing, auto exposure (AE) processing, and auto white balance (AWB) processing, and so forth, are performed.

A D/A converter 108 converts the digital image data for display stored in the image memory 106 into an analog signal, and provides the analog signal to the display unit 109. The display unit 109 displays an image on a display screen, such as LCD, in accordance with the analog signal from the D/A converter 108.

A codec unit 110 compresses and encodes the image data stored in the image memory 106 based on standards, such as JPEG and MPEG. The system controller 50 stores the encoded image data to a recording medium 112, such as a memory card, hard disk, and so on, via an interface (I/f) 111. Further, image data read out from the recording medium 112 via the I/F 111 is decoded and expanded by the codec unit 110, and stored in the image memory 106. By displaying the image data stored in the image memory 106 on the display unit 109 via the memory controller 107 and the D/A converter 108, an image can be reproduced and displayed.

A relighting processing unit 114 performs relighting processing in which brightness of a captured image is corrected by virtually illuminating the image with light (referred to as "virtual light", hereinafter) from a virtual light source. The relighting processing performed by the relighting processing unit 114 will be explained later in detail.

The system controller 50 performs overall control of the digital camera 100. A non-volatile memory 121 is configured with memory, such as EEPROM, and stores programs and parameters that are necessary for processing by the system controller 50. Each process of the present invention as described later is realized by developing, in a system memory 122, programs, constants and variables stored in the non-volatile memory 121 for operation of the system controller 50 and executing the programs.

An operation unit 120 receives operation, such as a menu setting, an image selection, and so on, by a user. A distance measuring sensor 123 measures the distance to an object, and outputs distance information corresponding to each pixel of a captured image (distance information detection).

Figure 2:
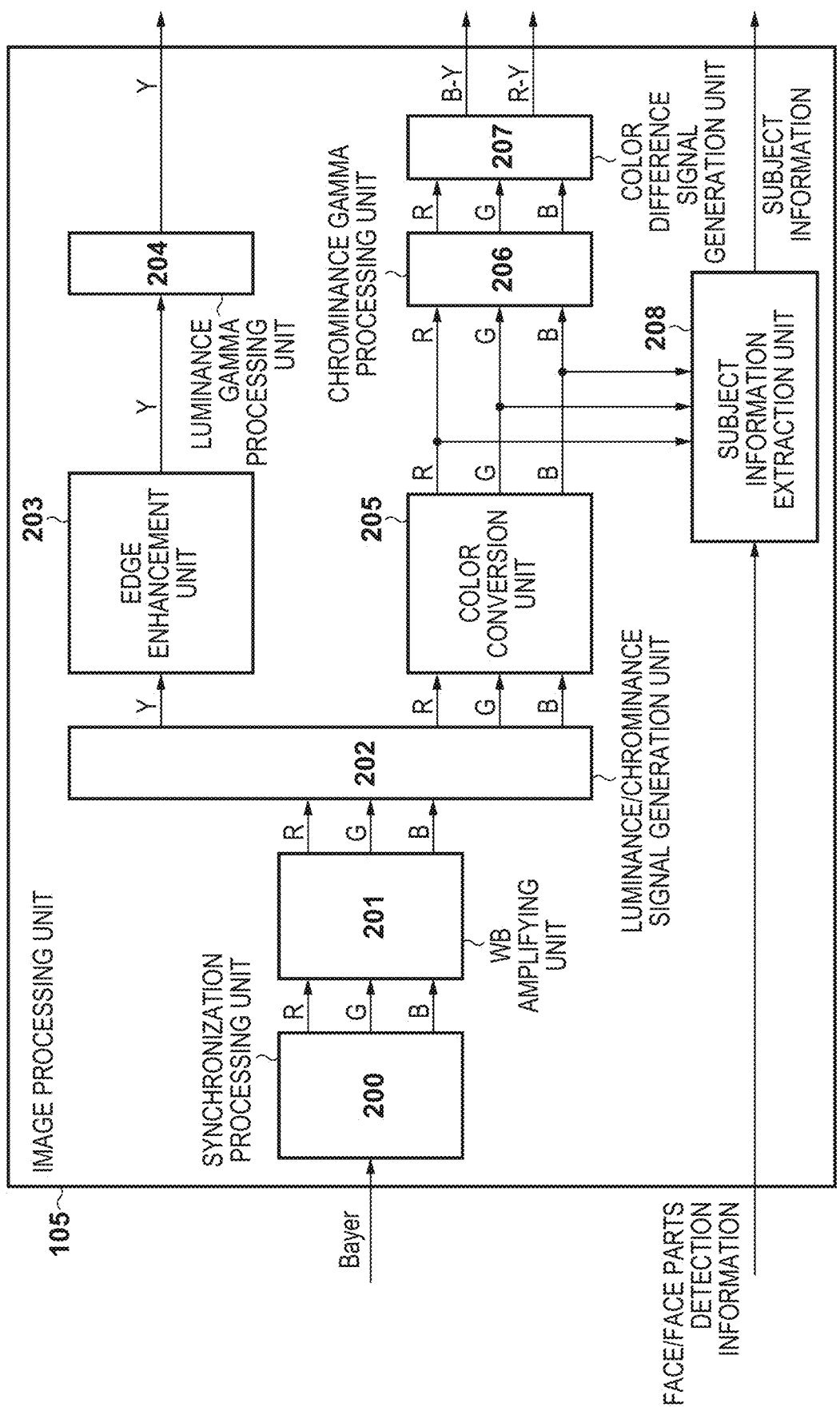
FIG. 2 is a block diagram illustrating a configuration of an image processing unit according to the embodiment.
Figure 3:
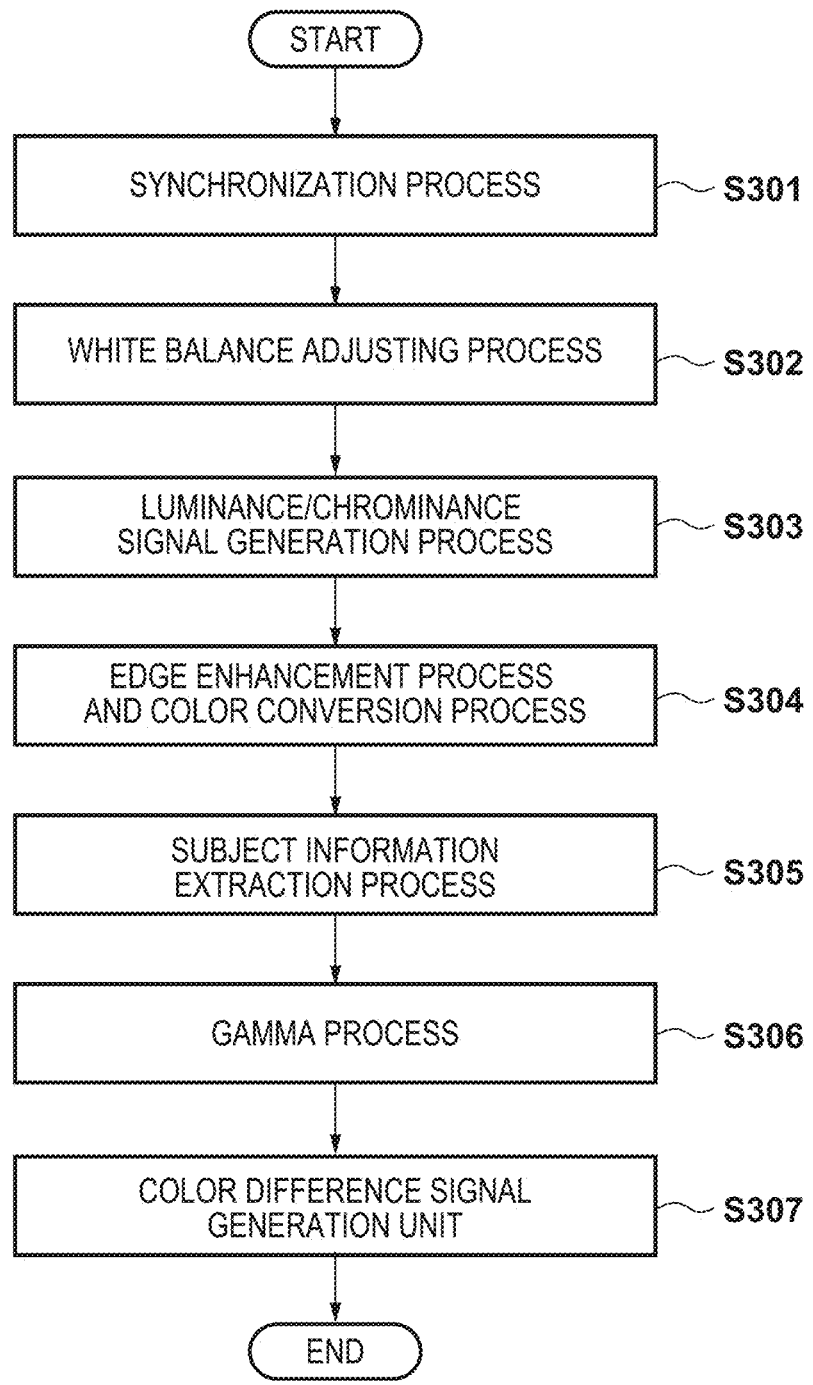
FIG. 3 is a flowchart illustrating processing performed by the image processing unit according to the embodiment.

Next, details of the image processing unit 105 will be described with reference to FIGS. 2 and 3. FIG. 2 is a block diagram illustrating a configuration of the image processing unit 105, and FIG. 3 is a flowchart showing processing performed by the image processing unit 105. In this embodiment, it is assumed that the image sensing unit 103 is covered with a color filter of Bayer arrangement. Accordingly, each pixel of the image sensing unit 103 outputs one of R, G and B image signals.

First in step S301, image signals inputted from the A/D converter 104 in FIG. 1 are inputted to a synchronization processing unit 200. The synchronization processing unit 200 performs synchronization process on inputted R, G and B image signals to generate R, G and B color signals for each pixel.

Next in step S302, a WB amplifying unit 201 applies gains to the generated R, G and B color signals of each pixel based on white balance gains calculated by the system controller 50 in a known process, thereby correcting white balance. The R, G and B color signals whose white balance is corrected by the WB amplifying unit 201 are inputted to a luminance/chrominance signal generation unit 202 in step S303. The luminance/chrominance signal generation unit 202 generates a luminance signal Y from the R, G and B color signals, and outputs the generated luminance signal Y to an edge enhancement unit 203, and outputs the R, G and B color signals to a color conversion unit 205.

In step S304, the edge enhancement unit 203 performs an edge enhancement process on the luminance signal Y, and outputs the result to a luminance gamma processing unit 204. Meanwhile, the color conversion unit 205 applies a matrix operation to the R, G and B color signals, converts them to have a desired color balance, and outputs the result to a chrominance gamma processing unit 206 and a subject information extraction unit 208.

In step S305, the subject information extraction unit 208 extracts information on the subject in a captured image based on the face size and face position information output from the face/face parts detection unit 113 and the R, G and B color signals output from the color conversion unit 205 (subject information detection). Here, the face size and face position information includes the size and position of the subject in the captured image, how the subject is illuminated, the shadow information of the subject, and so on. For example, the size and position of the subject are detected from the face size and face position information output by the face/face parts detection unit 113, and how the subject is illuminated and the shadow information are detected from the entire captured image, the average luminance information and luminance histogram information of the subject. More specifically, the range of the subject region including the face and body part of the subject is estimated based on the face size and face position information of the subject detected by the face/face parts detection unit 113.

In step S306, the luminance gamma processing unit 204 performs a gamma process on the luminance signal Y, and outputs the result to the image memory 106 via the memory controller 107. Meanwhile, the chrominance gamma processing unit 206 performs gamma correction on the R, G and B color signals, and outputs the result to a color difference signal generation unit 207. In step S307, the color difference signal generation unit 207 generates color difference signals R-Y and B-Y from the R, G and B signals, and outputs the result to the image memory 106 via the memory controller 107.

Figure 4:
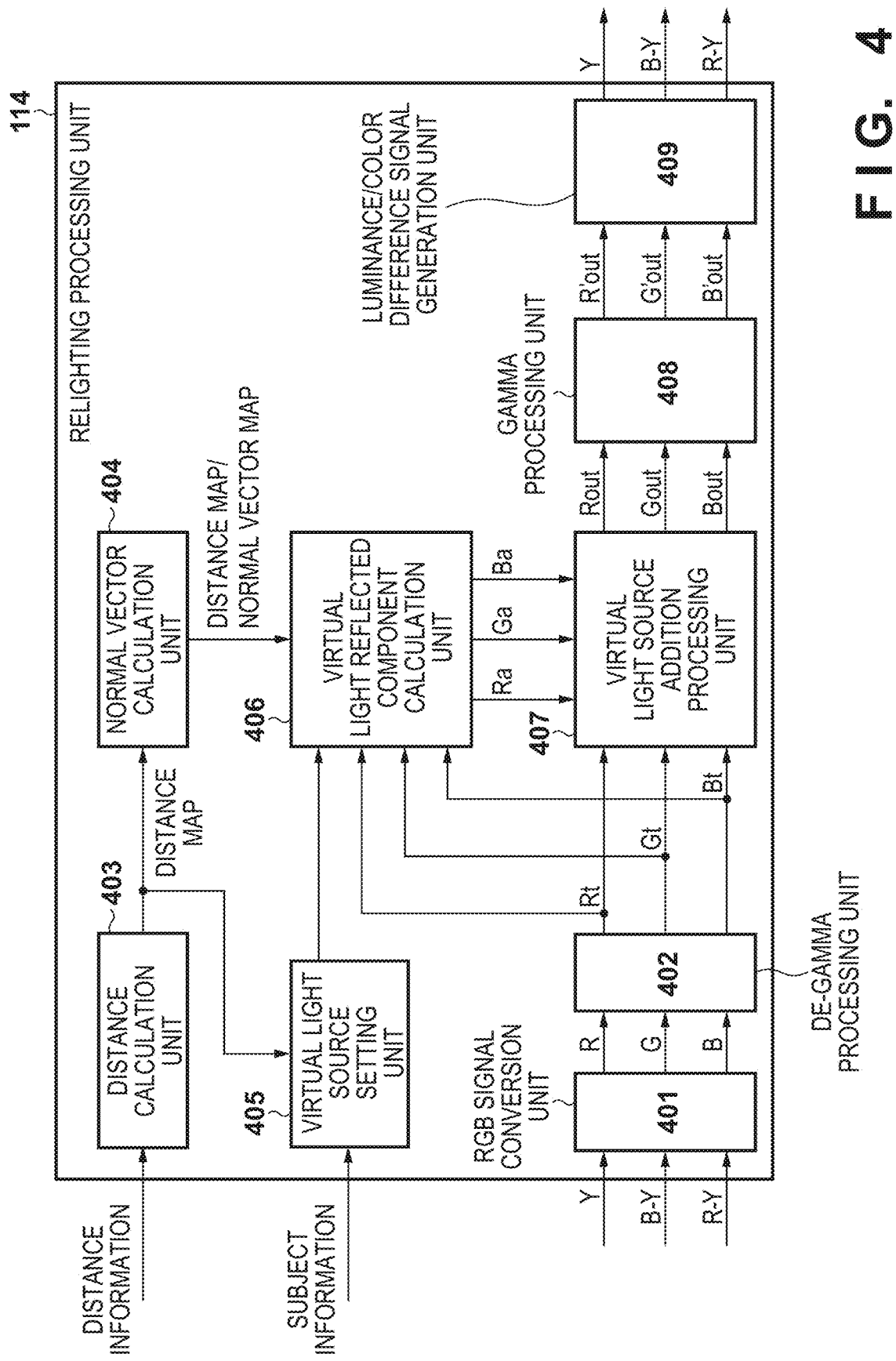
FIG. 4 is a block diagram showing a configuration of a relighting processing unit according to an embodiment of the present invention.

FIG. 4 is a block diagram illustrating the configuration of the relighting processing unit 114. The relighting processing unit 114 reads the luminance signal Y and the color difference signals B-Y and R-Y processed by the image processing unit 105 and recorded in the image memory 106, takes them as inputs, and perform relighting processing using a virtual light source. Here, general relighting processing will be described.

First, an RGB signal conversion unit 401 converts the input luminance signal Y and the color difference signals R-Y and B-Y into R, G and B signals, and outputs the result to a de-gamma processing unit 402. The de-gamma processing unit 402 performs an operation (de-gamma processing) whose characteristics are opposite to those of the gamma correction performed by the luminance gamma processing unit 204 and the chrominance gamma processing unit 206 of the image processing unit 105, and converts the R, G and B signals to linear data. The de-gamma processing unit 402 outputs the R, G and B signals that are converted to the linear data (Rt, Gt and Bt) to a virtual light source reflected component calculation unit 406 and a virtual light source addition processing unit 407.

On the other hand, a distance calculation unit 403 calculates a distance map based on the distance information of the subject acquired from the distance measuring sensor 123. The distance information of the subject is two-dimensional distance information obtained for each pixel of the captured image. A normal vector calculation unit 404 calculates a normal vector map as shape information representing the shape of the subject from the distance map calculated by the distance calculation unit 403. As a method of generating a normal vector map from the distance map, a known technique is used, but a specific processing example will be described with reference to FIG. 5.

Figure 5:
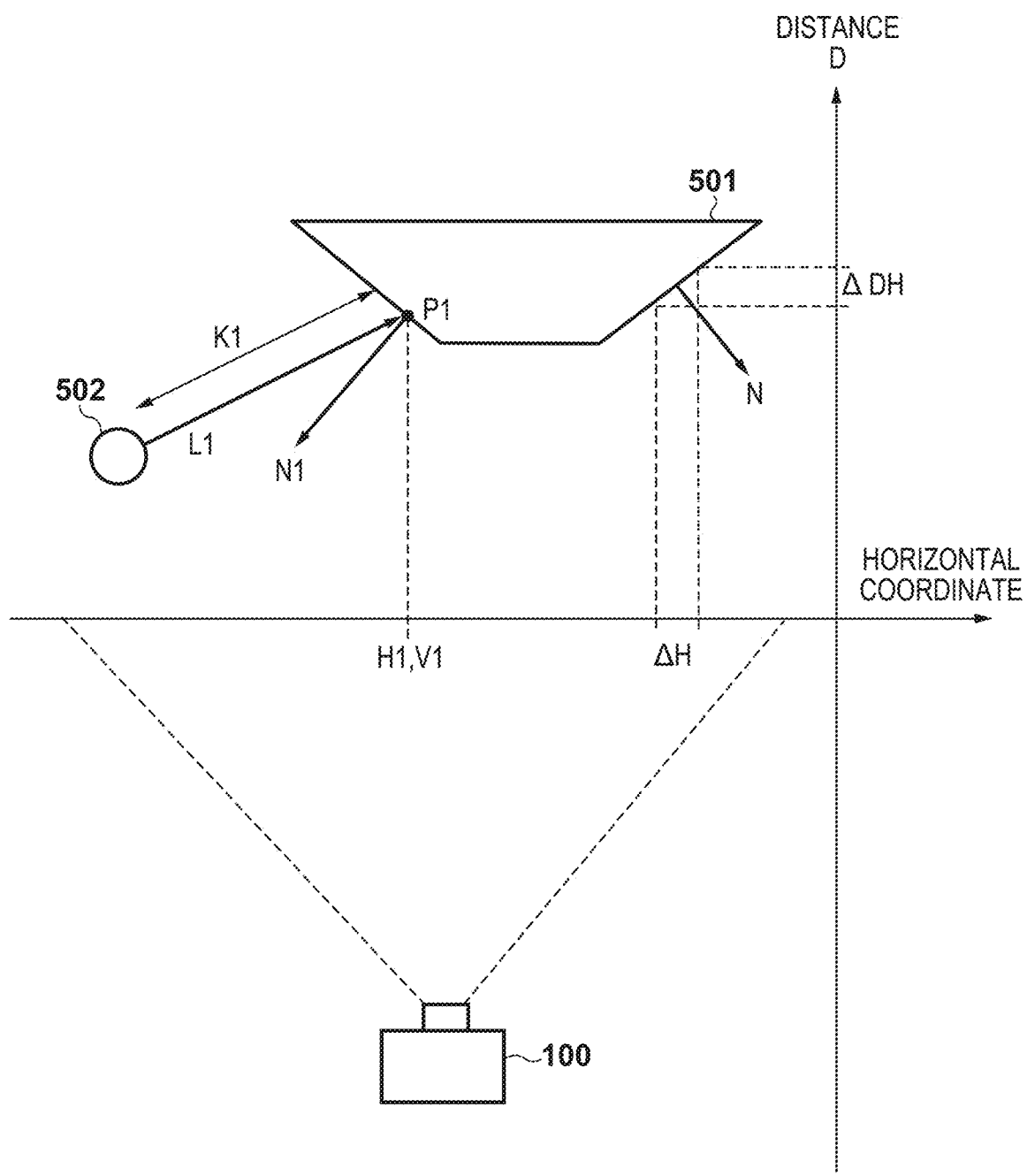
FIG. 5 is a schematic diagram illustrating reflection of virtual light from a virtual light source according to the embodiment.

FIG. 5 is a diagram showing the relationship between the image shooting coordinates with respect to the camera 100 and a subject. For example, with respect to the subject 501 as shown in FIG. 5, from a difference $\Delta DH$ of the distance D with respect to a difference $\Delta H$ of a captured image in the horizontal direction and, although not shown, a difference $\Delta DV$ of the distance D with respect to a difference $\Delta V$ of the captured image in the vertical direction (direction perpendicular to the plane of FIG. 5), inclination information of a part of the subject 501 is calculated. Then, a normal vector N is calculated from the calculated inclination information of the part of the subject. By performing the above processing on each pixel of the captured image, it is possible to calculate the normal vector N corresponding to each pixel of the captured image. The normal vector calculation unit 404 outputs the normal vector N corresponding to each pixel of the captured image to the virtual light source reflected component calculation unit 406 as the normal vector map.

Although the distance calculation unit 403 and the normal vector calculation unit 404 are described as being configured in the relighting processing unit 114, the present invention is not limited to this, and for example, may be configured in the distance measuring sensor 123 or the image processing unit 105, or may be configured independently.

A virtual light source setting unit 405 sets the parameters of a virtual light source based on the subject information inputted from the subject information extraction unit 208 of the image processing unit 105. For example, in a case where it is desired to increase the brightness of the entirety of a dark subject, parameters such as the position, the illumination area, and the intensity of the virtual light source are set such that the entire subject is included within the illumination area of the virtual light source.

Figure 6A:
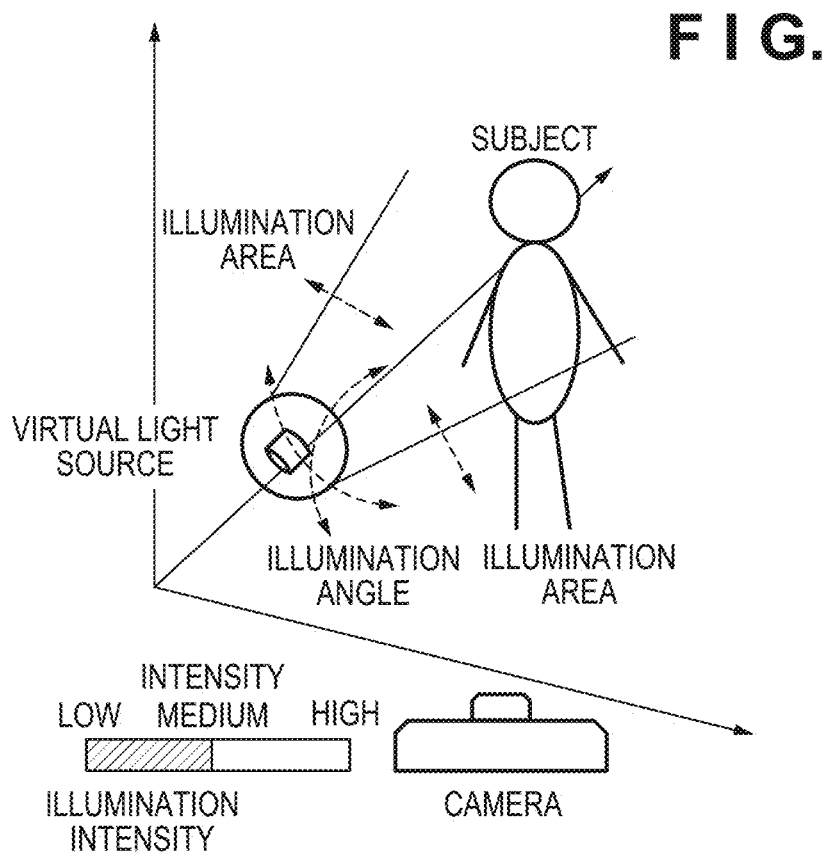
FIG. 6A and FIG. 6B are explanatory diagrams of parameter setting for the virtual light source according to the embodiment.
Figure 6B:
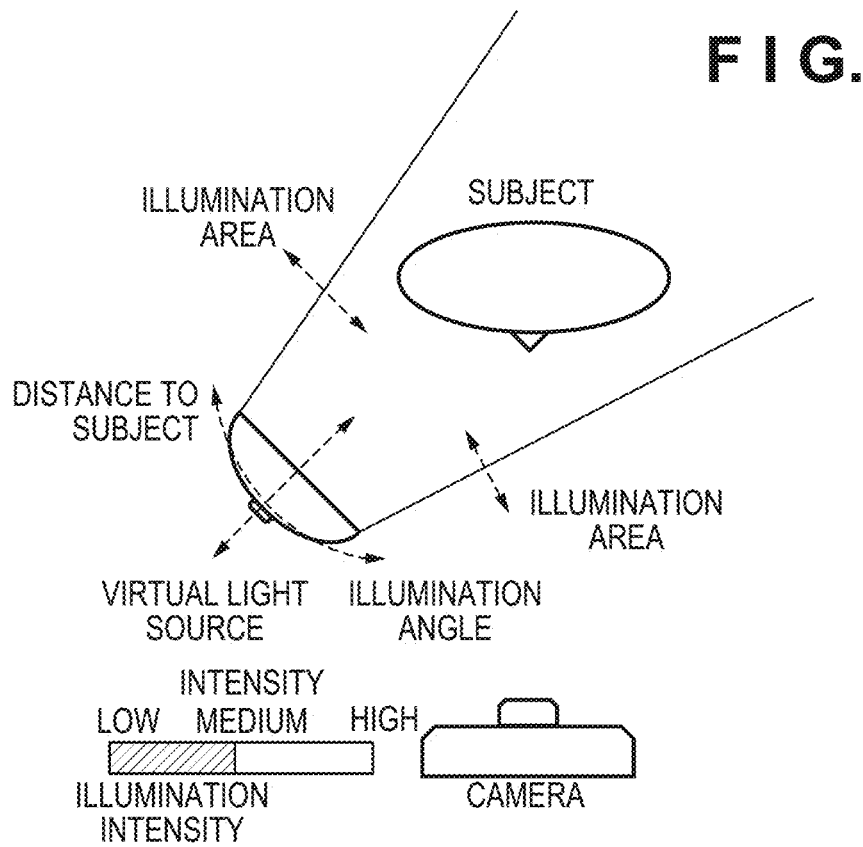

Here, with reference to FIG. 6A and FIG. 6B, parameters to be set for a virtual light source will be described taking a case where the subject is one person as an example. FIG. 6A is a perspective view showing the positional relationship between the subject and the virtual light source, and FIG. 6B is a plan view showing the positional relationship between the subject and the virtual light source. Regarding the position of the virtual light source, if the distance between the virtual light source and the subject is set to be short, the subject is illuminated by the strong light of the virtual light source, and conversely if the distance to the subject is set to be long, the subject is illuminated by the weak light of the virtual light source. Regarding the illumination area of the virtual light source, if the illumination area of the virtual light source is set to be wide, light can illuminate the entire subject. Conversely, if the illumination area is set to be narrow, light can illuminate only a part of the subject.

Here, if the illumination area is excessively widened, if there is a person or an object unrelated to the main subject, the light of the virtual light source illuminates the unrelated person or object. An illumination area is set based on information on the subject area estimated by the subject information extraction unit 208 in order to avoid unnecessary exposure of the virtual light to such a subject unrelated to the main subject. In the present embodiment, as an example, the illumination area of the virtual light is set with the subject's face as the center, the range in the vertical direction being roughly from bust to the head, and the range in the horizontal direction including the face and body, and the shape of the illumination area being a circle or an ellipse.

In the virtual light source reflected component calculation unit 406, based on the distance K between the light source and the subject, the normal information N and the parameters of the virtual light source set by the virtual light source setting unit 405, among the light virtually irradiated from the set virtual light source, the component which will be reflected by the subject is calculated. Specifically, the reflection components of the virtual light at the part of the subject corresponding to the coordinate position of the captured image is calculated so that the reflection components are inversely proportional to the square of the distance K between the virtual light source and the part of the subject corresponding to each pixel and is proportional to the inner product of the vector of the normal N and the vector of the light source direction L.

Here, a general calculation method of the reflection components of virtual light will be described with reference to FIG. 5. In FIG. 5, for the sake of simplicity of explanation, only the horizontal direction of the captured image is shown, but as described above, the direction perpendicular to the drawing is the vertical direction of the captured image. In the following description, a method of calculating the reflection components of virtual light at the point P1 on the subject 501 corresponding to the horizontal pixel position H1 and the vertical pixel position V1 (not shown) in the captured image will be described. In FIG. 5, the virtual light source 502 is set for the subject 501. The reflection components of the virtual light at the position (H1, V1) of the captured image shot by the camera 100 is proportional to the inner product of the normal vector N1 at the point P1 on the subject 501 and the light source direction vector L1 of the virtual light source 502, and inversely proportional to the square of the distance K1 between the virtual light source 502 and the point P1. The normal vector N1 and the light source direction vector L1 are three-dimensional vectors consisting of a horizontal direction, a vertical direction, and a depth direction (the direction indicated by the distance D in FIG. 5). When this relationship is expressed by a mathematical expression, the reflection components (Ra, Ga, Ba) of virtual light at the point P1 on the subject 501 are as shown by the following expressions (1).

$$Ra = \alpha \times (-L1 \cdot N1)/K1^2 \times Rt$$

$$Ga = \alpha \times (-L1 \cdot N1)/K1^2 \times Gt$$

$$Ba = \alpha \times (-L1 \cdot N1)/K1^2 \times Bt \qquad (1)$$

Here, $\alpha$ is the intensity of light from the virtual light source, the gain value of the rewriting correction amount, Rt, Gt, Bt are the RGB signals output from the de-gamma processing unit 402.

The reflection components (Ra, Ga, Ba) of the virtual light calculated as described above are output to the virtual light source addition processing unit 407. In the virtual light source addition processing unit 407, the processing shown by the following expressions (2) is performed in which reflection components (Ra, Ga, Ba) of the virtual light are added to the R, G and B signals output from the de-gamma processing unit 402.

$$Rout = Rt + Ra$$

$$Gout = Gt + Ga$$

$$Bout = Bt + Ba \qquad (2)$$

The R, B and G signals (Rout, Gout, Bout) which have undergone the relighting processing by the virtual light source addition processing unit 407 are input to a gamma processing unit 408 where gamma correction is performed. Then, a luminance/color difference signal generation unit 409 generates and outputs the luminance signal Y and the color difference signals R-Y and B-Y signals from the gamma-processed R, G and B signals (Rout, Gout, B'out).

An example of the relighting processing described above in the relighting processing unit 114 is shown in FIGS. 7A and 7B. FIG. 7A is an example of an image before relighting processing, and FIG. 7B is an example of the image after relighting processing. The subject which is dark as shown in FIG. 7A is corrected to be bright as shown in FIG. 7B by performing relighting processing which applies virtual light.

Figure 8A:
FIGS. 8A to 8D are views for explaining relighting processing for a plurality of persons according to the embodiment.
Figure 8B:
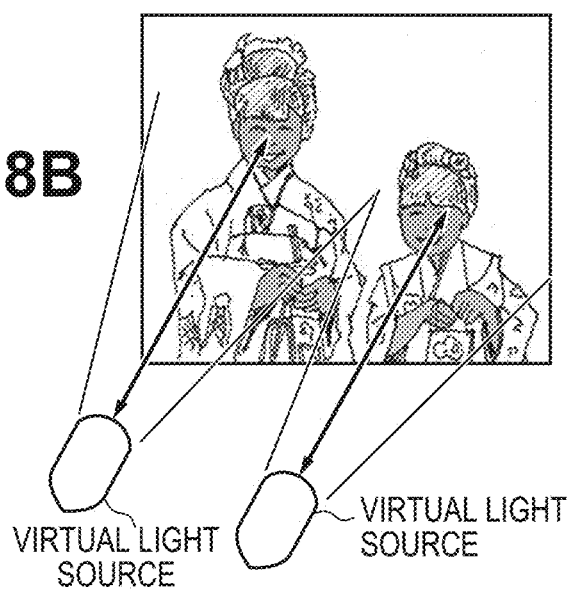
Figure 8C:
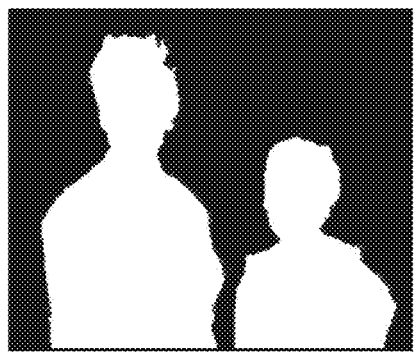
Figure 8D:
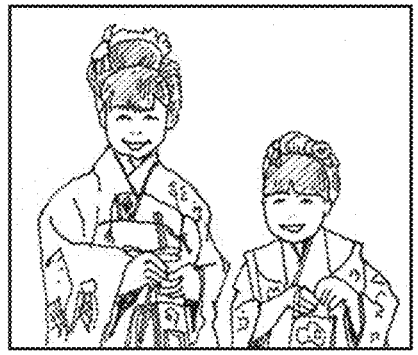

Further, FIGS. 8A to 8D show examples in which the above-described relighting processing is performed by the relighting processing unit 114 on a scene in which a plurality of subjects are present. FIGS. 8A to 8D show examples of images in the case where there are two subjects. FIG. 8A is an image before relighting processing, and FIG. 8B is a diagram showing a position and an illumination area of a virtual light source with respect to the image. FIG. 8C is a diagram of a calculation result of a reflected virtual light component calculated by the virtual light source reflect component calculation unit 406, and FIG. 8D is an example of an image after relighting processing. The two dark subjects as shown in FIG. 8A are subjected to relighting processing and illuminated with virtual light, and as a results, the subjects are corrected to be bright as shown in FIG. 8D.

The system controller 50 accumulates the luminance signal Y and the color difference signals R-Y and B-Y output from the relighting processing unit 114 in the image memory 106 under the control of the memory controller 107 and then the codec unit 110 compresses and encodes them. In addition, the processed signals are recorded in the recording medium 112 via the I/F 111.

Figure 9:
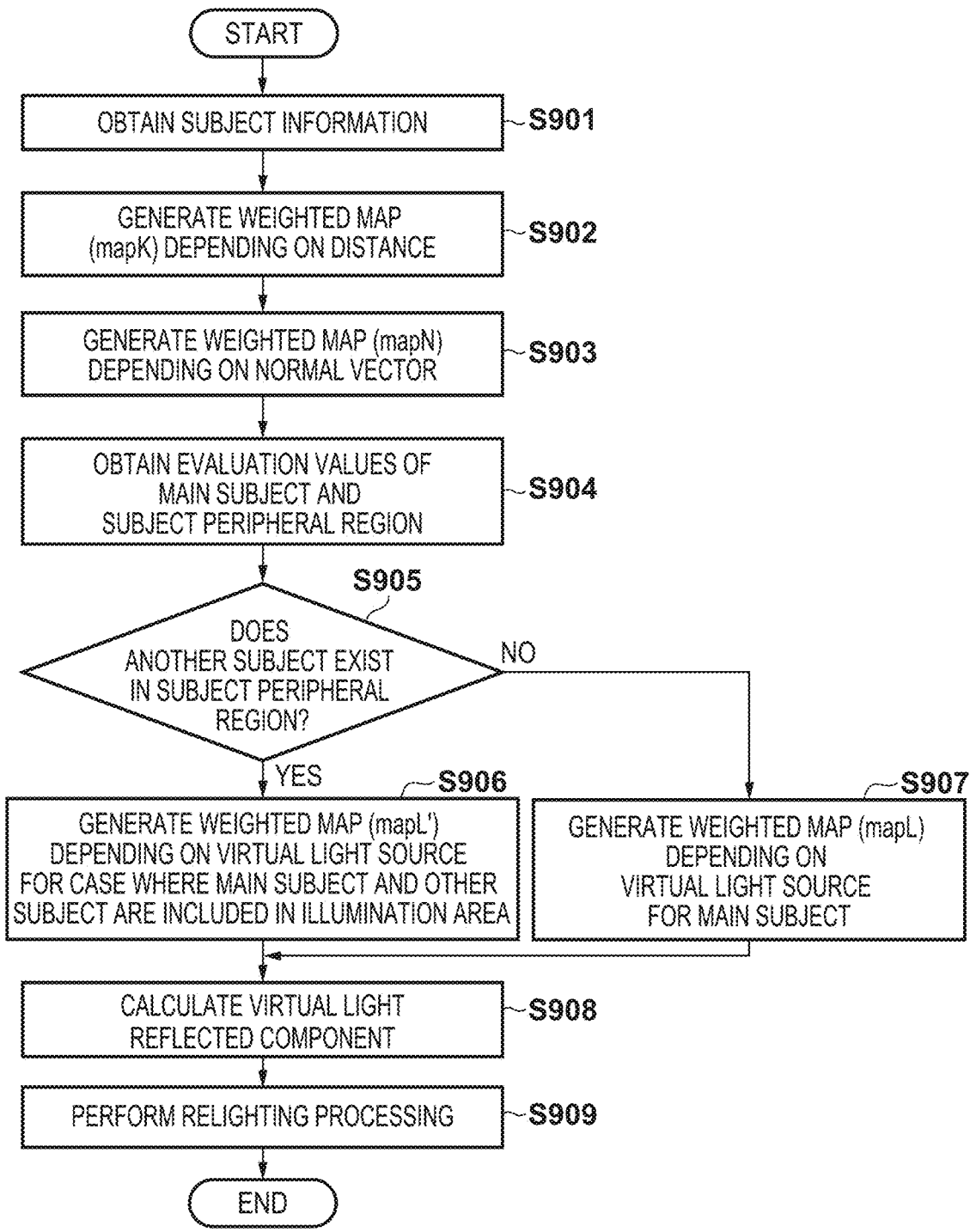
FIG. 9 is a flowchart of relighting processing according to a first embodiment of the present invention.

Next, the relighting processing by the relighting processing unit 114 according to the present embodiment will be described with reference to the flowcharts of FIG. 9. This processing is performed on the image processed by the image processing unit 105 and stored in the image memory 106 (namely, on the luminance signal Y and the color difference signals R-Y and B-Y) when the relighting processing is selected by an operation of a user via the operation unit 120.

Figure 10A:
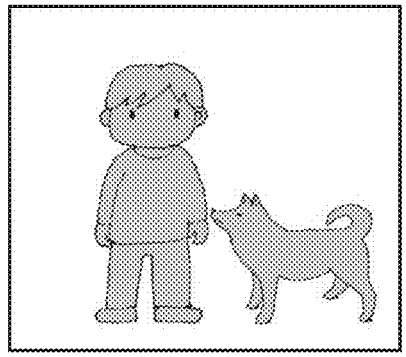
FIGS. 10A to 10D are views for explaining relighting processing according to the first embodiment.
Figure 11A:
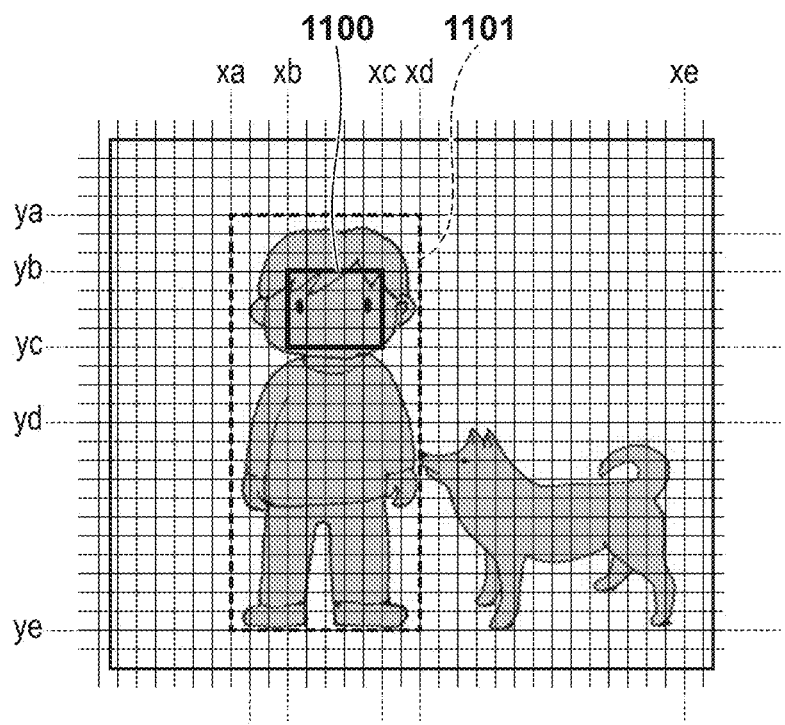
FIGS. 11A and 11B are diagrams showing a process of extracting a region subjected to relighting processing according to the first embodiment.

First, in step S901, the virtual light source setting unit 405 acquires the subject information, acquired by the subject information extraction unit 208, such as the size and position of a person as the main subject included in the image subjected to the relighting processing. The size and position information of the subject are obtained by the subject information extraction unit 208 by estimating the size and position of a subject region which includes the face and body part of the subject based on the face size and face position information of the subject detected by the face/face parts detection unit 113. For example, when a person and a dog are captured as shown in FIG. 10A, an area 1100 in FIG. 11A shows a face area of the face detected by the face/face parts detection unit 113, and an area 1101 is a subject region estimated by the subject information extraction unit 208. As described above, the face/face parts detection unit 113 detects the person as a main subject, but does not detect the dog.

In step S902, the distance calculation unit 403 generates a distance weighted map (mapK) based on the distance between the digital camera 100 and the subject in the image. Specifically, first, the distance calculation unit 403 calculates the distance K on a pixel-by-pixel basis (distance map) based on the two-dimensional distance information obtained pixel by pixel of the captured image acquired from the distance measuring sensor 123. Then, a value obtained by normalizing $1/(K^2)$ with an arbitrary bit width on a pixel-by-pixel basis is defined as the distance weighted map (mapK).

Next, in step S903, a normal vector map (mapN) is generated by the normal vector calculation unit 404 based on the distance map acquired from the distance calculation unit 403. Specifically, as described with reference to FIG. 5, the subject normal vector N is calculated on a pixel-by-pixel basis and its direction cosine with respect to each coordinate axis direction is calculated. Then, the obtained direction cosine for each pixel is represented by an arbitrary bit width, and it is taken as the normal weighted map (mapN).

In step S904, the virtual light source setting unit 405 uses the subject information of the main subject acquired from the subject information extraction unit 208 in step S901 and the distance weighted map (mapK) calculated by the distance calculation unit 403 in step S902 to obtain evaluation values of the main subject and a peripheral region of the subject region. Specifically, as shown in FIG. 11A, the entire distance weighted map (mapK) is divided into blocks, and an average distance value is obtained for each block. Then, the value obtained by dividing the total sum of the average distance values of the blocks included in the face area 1100 of the main subject (x coordinates: xb to xc, y coordinates: yb to yc) by the number of blocks in the face area 1100 is obtained as the evaluation value of the main subject. On the other hand, as for the periphery region of the main subject, the average distance value of each block in the periphery of the subject region estimated by the subject information extraction unit 208 (hereinafter, referred to as "subject peripheral region"), that is outside the subject region 1101 in FIG. 11A, is obtained as the evaluation value.

Although FIG. 11A has been described assuming that the entire distance weighted map (mapK) is divided into blocks and the average distance values are obtained for all blocks, the present invention is not limited to this. For example, with respect to the subject peripheral region, a configuration may be adopted in which the average distance values may be obtained for blocks only within a predetermined range near the subject region 1101. More specifically, the range of the number of blocks in the vertical and horizontal directions in the subject peripheral region for which the average distance values are to be obtained may be determined such that, based on the size of the face region or the subject region, the range extends in the vertical direction up to a predetermined number of times of the vertical length of the face region or subject region, and extends in the horizontal direction up to a predetermined number of times of horizontal length of the face region or subject region.

In step S905, the virtual light source setting unit 405 uses the evaluation value of the main subject acquired in step S904 and the evaluation value of each block in the subject peripheral region to determine whether or not another subject exists within a distance range of the main subject in the subject peripheral region. In a case where it is determined that there is another subject within the distance range of the main subject, the process proceeds to step S906, and in a case where it is determined that there is no other subject within the distance range of the main subject, the process proceeds to step S907.

Here, the determination as to whether or not there is another subject within the distance range of the main subject is performed as follows. First, as shown in FIG. 11B, for each block in the subject peripheral region, it is determined whether or not the evaluation value is within ±δ of the evaluation value of the face region 1100.

Figure 11B:
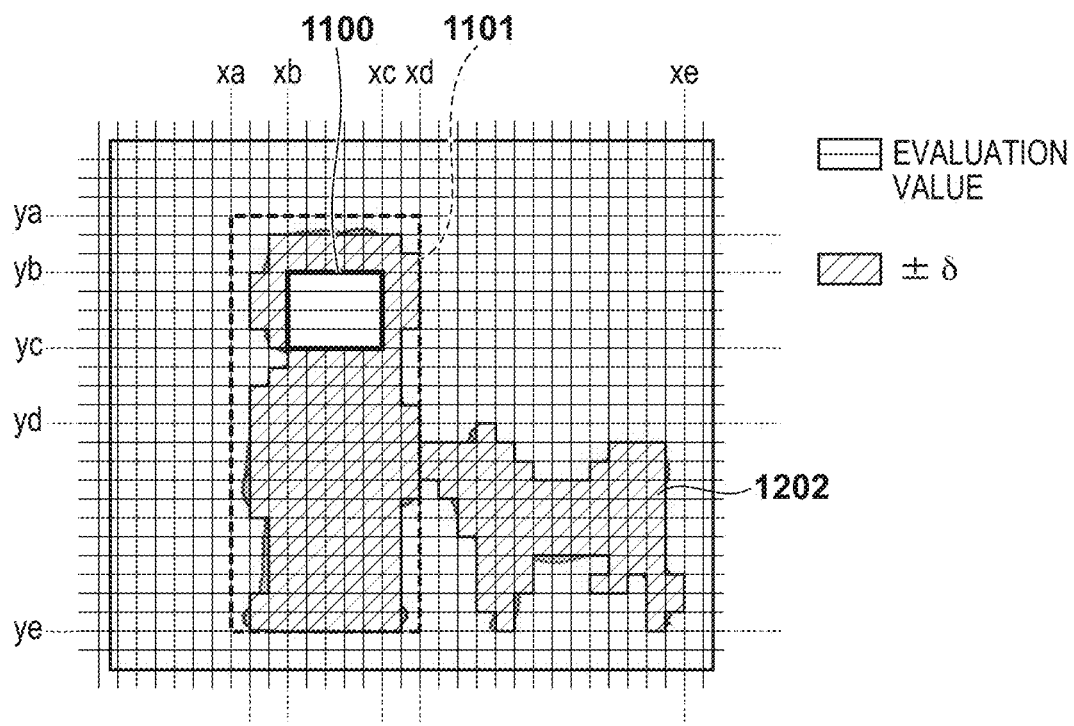

In FIG. 11B, a horizontal line indicates an evaluation value of the face area 1100, and a hatched area indicates a block in which the evaluation value of each block is determined to be within ±δ of the evaluation value of the face area 1100. In FIG. 11B, for example, the x coordinate of the subject region 1101 extends from xa to xd in the x axis direction, and one or more blocks whose evaluation values are within the range of the evaluation value of the face region 1100±δ exist in a range of the x coordinates from xd to xe in the right direction of the subject region 1101 in each row. Therefore, it is determined that another subject exists within the distance range of the main subject in the right direction. Namely, in the present embodiment, a range of the evaluation value from the evaluation value of the face area is called the distance range of the face area.

On the other hand, the y coordinate of the subject region 1101 extends from ya to ye in the y-axis direction, and no block whose evaluation value is within the range of the evaluation value of the face region 1100±δ exists in the vertical direction of the subject region 1101. Therefore, it is determined that another subject does not exist within the distance range of the main subject in the vertical direction of the subject region 1101. If it is determined that another subject exists within the distance range of the main subject in at least one of the horizontal direction and the vertical direction of the subject region 1101, YES is determined in step S905.

Figure 10B:
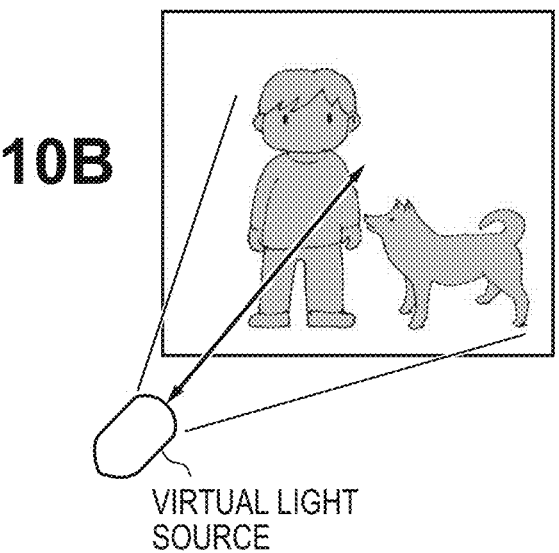

In step S906, the virtual light source setting unit 405 extracts another subject within the range of the evaluation value of the face area±δ determined in step S905, and generates a virtual light weighted map such that the main subject and the extracted other subject are included in the illumination area. Specifically, the light source direction vector −L of the virtual light source is calculated for each pixel, and the direction cosine for each coordinate axis direction is calculated. Then, the obtained direction cosine is expressed with an arbitrary bit width for each pixel to obtain a weighted map (mapL) by the virtual light source. FIG. 10B is a diagram illustrating an example in which the illumination area is set so as to illuminate both the person who is the main subject and the dog located next to the main subject with virtual light as described above.

The setting of the parameters (position/intensity) of the virtual light source for calculating the light source vector −L of the virtual light source is determined based on the subject information input from the subject information extraction unit 208. For example, if the luminance distribution in the face area of the acquired subject is biased, the position and intensity of the virtual light source are determined so that the virtual light illuminates the area with a low luminance value.

For example, assuming that the coordinates in the captured image of the region with a low luminance value are (x1, y1), the reflection components ((Ra (x1, y1), Ga (x1, y1), Ba (x1, y1)) of the virtual light by the subject are represented by the following equations (3).

$$Ra(x1,y1) = \alpha \times (-L(x1,y1) \cdot N(x1,y1))/K(x1,y1)^2 \times Rt$$

$$Ga(x1,y1) = \alpha \times (-L(x1,y1) \cdot N(x1,y1))/K(x1,y1)^2 \times Gt$$

$$Ba(x1,y1) = \alpha \times (-L(x1,y1) \cdot N(x1,y1))/K(x1,y1)^2 \times Bt \quad (3)$$

In equations (3), α is the light intensity of the virtual light source. Further, L(x1, y1) is a light source direction vector of the virtual light source at a position on the subject corresponding to the coordinates (x1, y1), and N(x1, y1) is a normal vector at a position on the subject corresponding to the coordinates (x1, y1). Further, K(x1, y1) indicates the distance between the virtual light source and the position on the subject corresponding to the coordinates (x1, y1). In order for the virtual light to illuminate the subject located at the coordinates (x1, y1), which is an area having a low luminance value, the intensity a of the virtual light source and the distance K(x1, y1) to the subject are controlled so that (Ra (x1, y1), Ga (x1, y1), Ba (x1, y1)) have positive values.

The illumination area as the parameter of the virtual light source is determined to be a range including the subject region obtained from the subject information extraction unit 208 and the area of the other subject within the distance range of the main subject determined in step S905.

In addition, if the intensity a of the virtual light source is excessively increased, adverse effects such as overexposure and grayscale inversion may occur, so the range of the intensity a of the virtual light source is controlled to be within ±δ of an average luminance value of a region having a high luminance value outside the illumination area.

With the above-described processing, the virtual light source setting unit 405 calculates the range of the position of the virtual light source, the light intensity, and the illumination area, and determines the setting values.

Figure 10C:
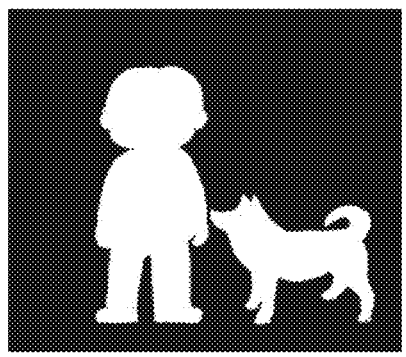

FIG. 10C is a diagram illustrating an example of a reflected component of virtual light calculated by the virtual light source reflection component calculation unit 406.

On the other hand, in step S907, a weighted map of normal virtual light is generated. That is, only the method of calculating the illumination area as the parameter of the virtual light source is different from the process shown in step S906. In other words, in step S906, the parameters of the virtual light source are determined so that the subject and the subject peripheral region are included in the illumination area. However, in step S907, it is determined in step S905 that there is no object at the distance of the subject around the subject. For this reason, the illumination area is determined only from the acquired luminance distribution information of the face area so as to include an area with a low luminance distribution in the face area without considering the surroundings of the subject. Regarding parameters other than the illumination area, the same process as in step S907 is performed.

In step S908, the virtual light source reflected component calculation unit 406 calculates the virtual light reflection components (Ra, Ga, Ba) for the detected subject area. Note that the reflection components (Ra, Ga, Ba) can be calculated using Equation (1) as described above. This equation (1) is replaced with the distance weighted map (mapK) obtained in step S902, the weighted map (mapN) based on the normal of the subject in S903, and the weighted map (mapL) based on the virtual light source obtained in step S906 or S907. That is, the reflection component of the virtual light can be calculated using the following equations (4).

$$Ra = \alpha \times mapL \cdot mapN \cdot mapK \times Rt$$

$$Ga = \alpha \times mapL \cdot mapN \cdot mapK \times Gt$$

$$Ba = \alpha \times mapL \cdot mapN \cdot mapK \times Bt \quad (4)$$

As described above, the calculation result of the virtual light reflection component shows a result of a multiplication between the gain a (intensity), the weighted map (mapL) by the virtual light source, the weighted map (mapN) by the normal vector, and the weighted map (mapK) by the distance.

In step S909, relighting processing is performed. Specifically, as shown in the above equations (2), the virtual light source addition processing unit 407 adds the virtual light reflection components (Ra, Ga, Ba) calculated in step S908 to the output (Rt, Gt, Bt) of the de-gamma processing unit 402. When the relighting processing ends, the processing by the relighting processing unit 114 ends.

Figure 10D:
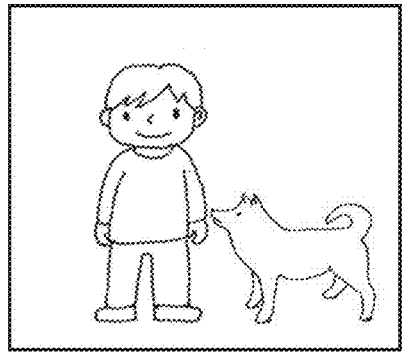

By the above processing, as shown in FIG. 10D, even when the person who is the main subject and the dog beside the main subject are dark in the image, both of the person who is the main subject and the dog beside the main subject are corrected to be bright by the relighting processing as described above. Conversely, even in the case of an image in which a dog is present right next to the main subject on the xy coordinates, if the distance between the person and the dog in the depth direction is significantly different, the evaluation value of the block in the dog area will not be within a range of the evaluation value of the face area±δ described above, and the dog will not be subjected to the relighting processing.

In other words, in a case of performing relighting processing on an image including a subject that can be detected in a specific detection process and a subject that cannot be detected in the specific detection process, even if the two subjects are of the same type, if the distance between the two subjects in the depth direction is shorter than a certain distance, both subjects are subject to the relighting processing. On the other hand, in a case where the distance in the depth direction is more than the certain distance, the subject that can be detected by the specific detection process is subjected to the relighting processing, and the subject that cannot be detected by the specific detection process is not subjected to the relighting processing.

According to the first embodiment as described above, in a scene in which a main subject detected by subject detection and a subject not detected by the subject detection coexist, it is possible to reduce unnaturalness that only the main subject is corrected to become bright, and the subject not detected by the subject detection remains dark.

Modification

Figure 12:
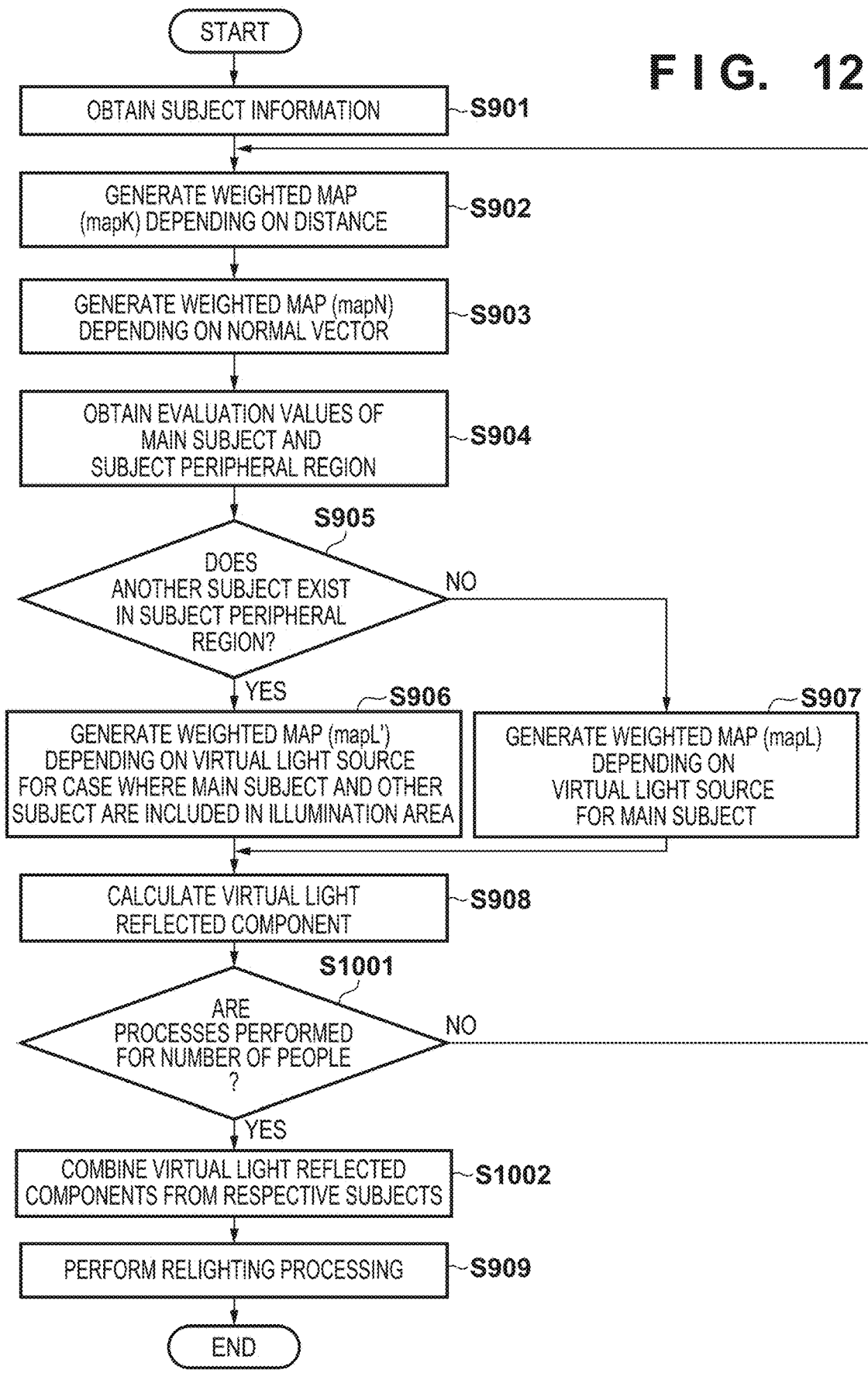
FIG. 12 is a flowchart of relighting processing according to a modification of the present invention.

Next, a modification of the first embodiment will be described. Here, the relighting processing performed on an image in which a plurality of persons detected as main subjects and a subject other than a person are shot will be described with reference to FIG. 12. In the processing of FIG. 12, steps S901 to S908 are the same as the processes described in FIG. 9, and thus description thereof will be omitted. Hereinafter, only the processes in steps S1001 to S1002 not described in FIG. 9 will be described.

In step S1001, it is determined whether the processes from S902 to S908 have been completed for the number of main subjects. If the processes have not been completed for the number of main subjects, the process returns to step S902, and if the processes have been completed for the number of main subjects, the process proceeds to step S1002. Note that in the determination in step S905, the subject peripheral region is a region excluding the subject regions of a plurality of detected persons.

In step S1002, the virtual light source reflected component calculation unit 406 combines the virtual light reflected components corresponding to each main subject calculated in step S908, and calculates the virtual light reflected component of the entire image. The combining method may be any existing method. For example, lighten composite may be used.

With the above processing, even when a plurality of main subjects are detected, the same effect as in the first embodiment can be obtained.

Second Embodiment

Next, a second embodiment of the present invention will be described. In the second embodiment, a user specifies a subject subjected to the relighting processing by using the display unit 109 and the operation unit 120, and the relighting processing by the relighting processing unit 114 is performed on the specified subject.

Figure 13:
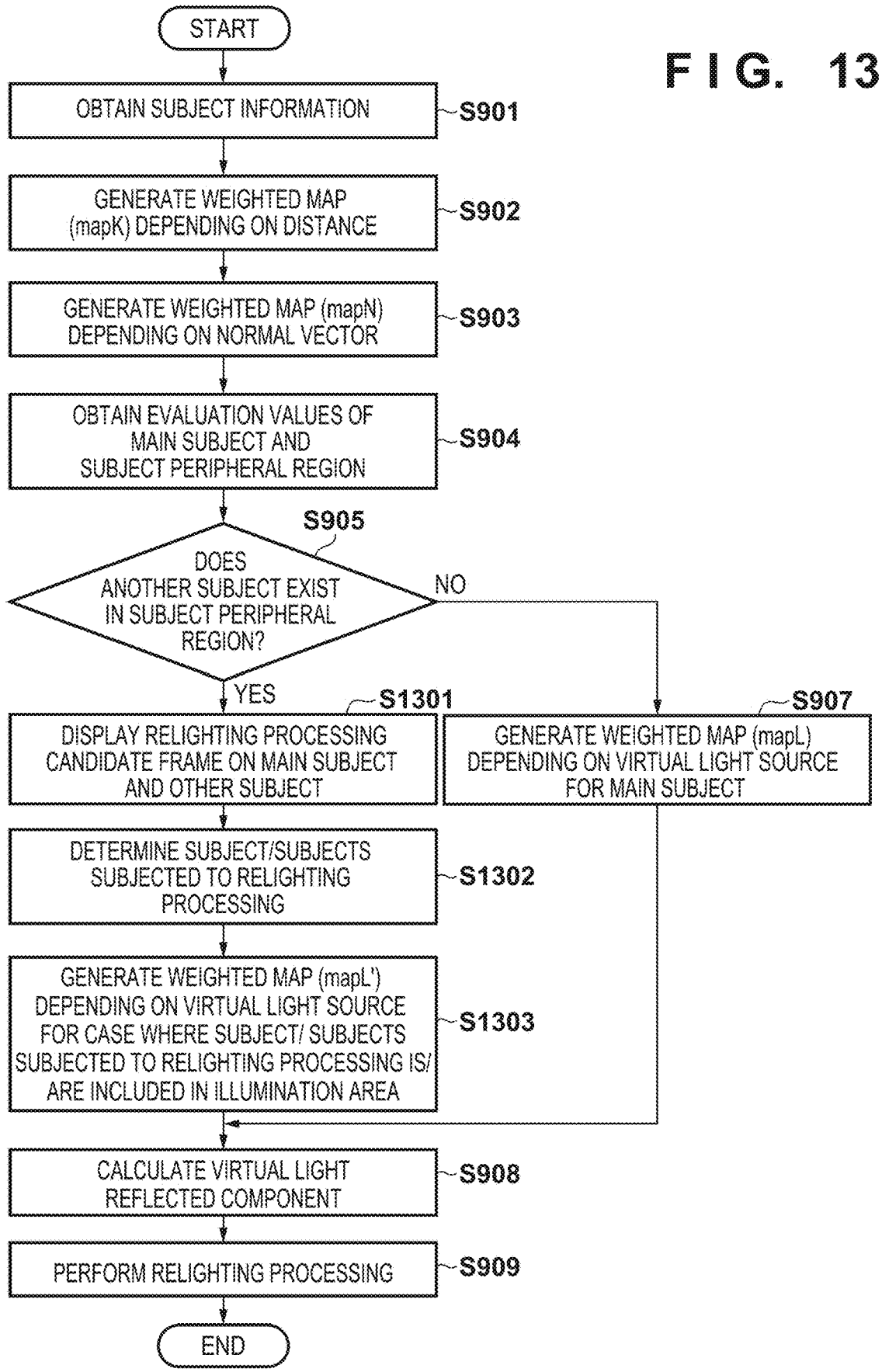
FIG. 13 is a flowchart of relighting processing according to a second embodiment of the present invention.

FIG. 13 is a flowchart showing the relighting processing in the second embodiment. Since steps S901 to S905 and S907 to S909 are the same as the processes described in FIG. 9, thus description thereof will be omitted. Hereinafter, only the processes in steps S1301 to S1303 not described in FIG. 9 will be described.

Figure 14A:
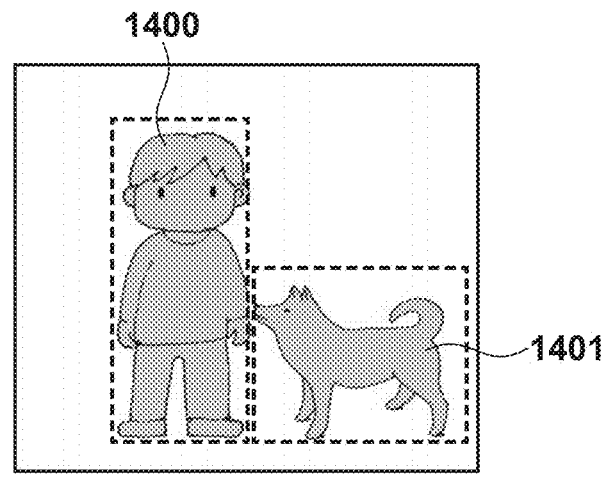
FIGS. 14A to 14C are diagrams illustrating an example of images displayed on a display unit for selecting a subject to be subjected to relighting processing according to the second embodiment.

If it is determined in step S905 that another subject exists within the distance range of the main subject in the subject peripheral region, then in step S1301, the main subject and the other subject in the subject peripheral region are displayed in an emphasized manner in the display unit 109 to show that the main subject and the other subject are candidates for the relighting processing. An example of the emphasized display is shown in FIG. 14A. Here, an example is shown in which dotted frames are superimposed on a person who is a main subject 1400 and on a dog that is a subject 1401 located next to the main subject to emphasize them.

Figure 14B:
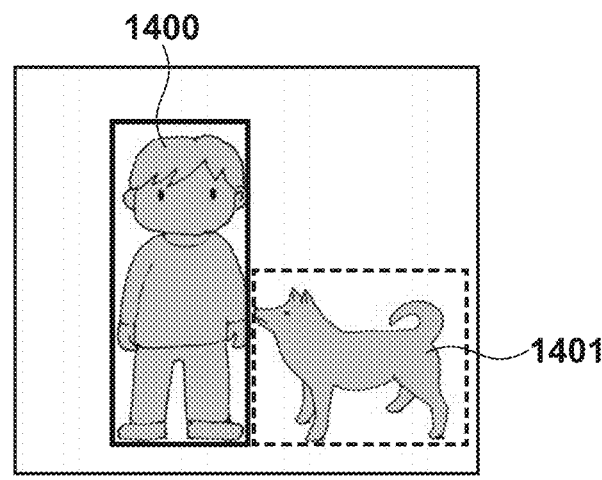
Figure 14C:
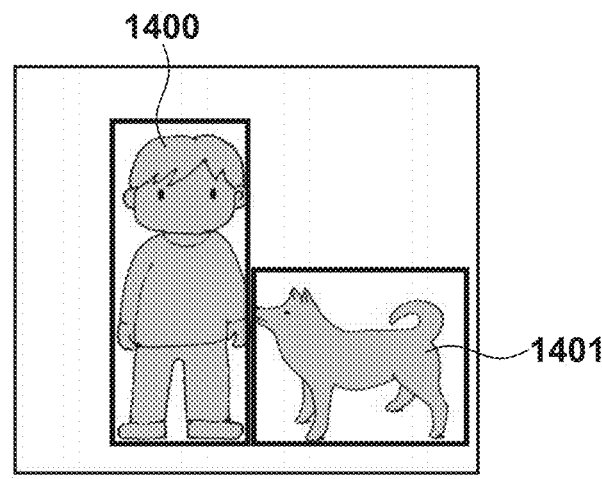
Figure 15A:
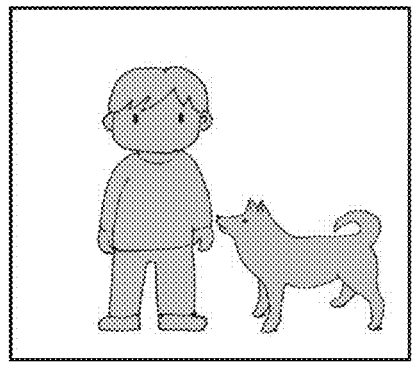
FIGS. 15A to 15D are diagrams for explaining a conventional relighting processing when a person and a subject other than the person are present.
Figure 15B:
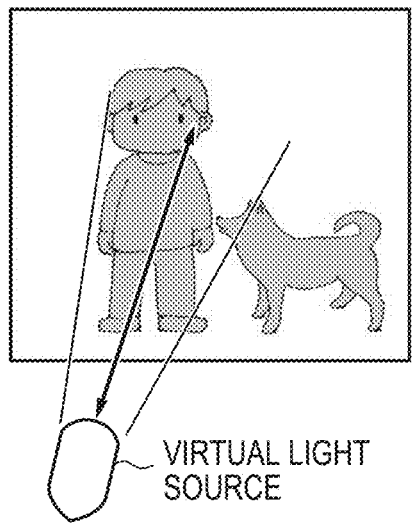
Figure 15C:
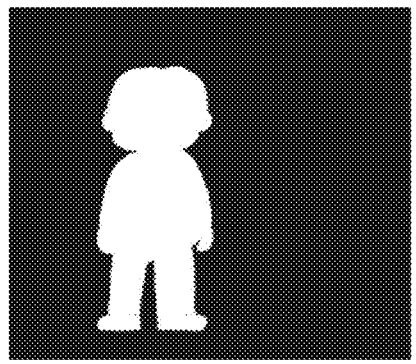
Figure 15D:
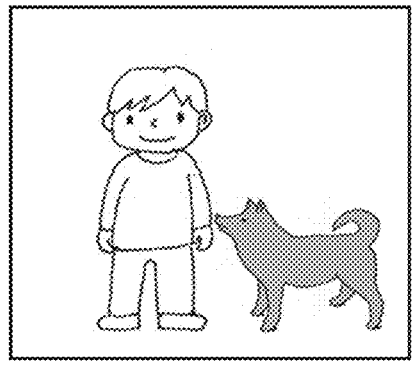

In step S1302, from among the candidates for the relighting processing displayed in the emphasized manner in the display unit 109 in step S1301, the user determines the target/targets for the relighting processing using the operation unit 120. FIG. 14B shows an example in which the user selects only the main subject 1400 as the target for the relighting processing, and FIG. 14C shows an example in which the user selects both the main subject 1400 and the subject 1401 as the targets for the relighting processing.

In step S1303, the virtual light source setting unit 405 generates a weighted map image based on settings of the virtual light source such that the subject/subjects targeted for the relighting processing selected by the user using the operation unit 120 in step S1302 is/are included in the illumination area. As shown in FIG. 14B, if the user selects only the main subject 1400 as the target for the relighting processing, the illumination area is determined so that only the main subject 1400 is included in the illumination area of the virtual light source. The process is the same as the process performed in step S907 in FIG. 9. On the other hand, as shown in FIG. 14C, when the user selects both the main subject 1400 and the subject 1401 as targets for the relighting processing, the illumination area is determined so that both the main subject 1400 and the subject 1401 are included in the illumination area. The process is the same as the process performed in step S906 in FIG. 9.

Through the above processing, the relighting processing unit 114 performs the relighting processing on the subject/subject selected by the user among the subjects included in the captured image.

According to the second embodiment as described above, in a scene in which a main subject detected by subject detection and a subject not detected by the subject detection coexist, it is possible to perform the relighting processing in accordance with the user's preference.

Although the digital camera 100 has been described as an example of the image capturing apparatus in the above-described embodiments, the present invention can be applied to an image processing apparatus such as a personal computer. In that case, the image processing apparatus may acquire an image photographed by an imaging unit such as a camera, and perform the relighting processing on the acquired image with virtual light source parameters arbitrarily set by a user. If there is additional information such as a face detection result, distance information, normal vector information, and so forth, together with the image, the relighting processing may be performed using such information. Even in such a case, by acquiring distance information of the subject and the periphery of the subject, determining whether the subject and the periphery of the subject are at the same distance, and presenting a preferred illumination area of a virtual light source, the relighting processing can be performed without a user setting the parameters of the virtual light source from scratch.

Further, in the present embodiment, the case where there is one virtual light source has been described, but the present invention is not limited to this. For example, a configuration may be employed in which the relighting processing is performed using a plurality of virtual light sources, with one virtual light source being located on the upper left of the subject and another virtual light source being located on the upper right of the subject.

Further, in the present embodiments, the case where the image is corrected to become brighter by the added light has been described, but relighting processing for making the image darker may be employed. In that case, the gain value α of the virtual light source is set to a minus value (subtracted light). Further, a configuration may be employed in which specular reflection light is added to the subject. Thus, a virtual light can be selected from a plurality of types.

The method of calculating the distance D between the position of the virtual light source and the pixel to be processed is not limited to the method explained in the embodiments, and any calculation method may be used. For example, the position of the camera and the position of the subject may be acquired as a three-dimensional position, and the distance may be calculated in three dimensions.

In addition, an equation that is inversely proportional to the square of the distance is used upon adding a virtual light source. However, calculation for the added amount of the virtual light source is not limited to the calculation using this method. For example, a formula that is inversely proportional to the distance D or a formula in which the illumination area changes in a Gaussian distribution may be used.

Also, in the present embodiment, the subject information extraction unit 208 has been described using an example in which subject information is detected based on the information on the detection result of the face/face parts detection unit 113, however, the present invention is not limited thereto. If only the face/face parts detection unit 113 is used, the subject region is estimated in the subject information extraction unit 208 based on the face/face parts detection result, and an accurate subject region may not be detected. For example, if the subject is hand standing or the body is twisted, the illumination area cannot be determined properly. As another detection means, a subject region detecting means for detecting the subject region including the body part by using a known technique such as machine learning may be provided. With such a configuration, an accurate subject region can be detected, and the illumination area of the virtual light source can be accurately determined even in a situation in which a person is hand standing or making a pose by twisting the body.

Further, in the above-described example, the case where a person is detected as the main subject has been described, however, the main subject is not limited to a person, and a predetermined subject (for example, a car, an animal, a plant, and the like) may be detected as the main subject.

Further, a configuration using a plurality of different subject detection units may be employed. For example, there are a head detection that detects a head region where a human head is present from a captured image and a pet detection that detects a pet such as a cat or a dog from a captured image using a method based on pattern recognition or machine learning, Alternatively, there is a landmark detection that detects a landmark such as a famous statue or a building using GPS information or the like added to a captured image. The head detection is effective when a person is facing sideways and no face is detected. In the above-described example, an example has been described in which, upon determining whether or not the peripheral area of the subject is at the same distance as the subject, the entire image is divided into blocks and the determination is performed. However, by using the head detection, pet detection, and landmark detection, it is possible to narrow down the peripheral area for the determination to the detected area.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-040881, filed on Mar. 6, 2019 which is hereby incorporated by reference herein in its entirety.

What is claimed is:

1. An image processing apparatus comprising:
an acquisition unit that acquires (a) a first image obtained through shooting and (b) distance information of the first image, wherein the distance information includes information on a distance to a subject in the first image in a depth direction;
a detection unit that detects a main subject from the first image;
an extraction unit that extracts another subject that exists in a predetermined region of the first image, the predetermined region being within a predetermined distance in the first image from the main subject, based on the distance information of the main subject;
a setting unit that sets parameters of one or more virtual light sources that emit virtual light to the main subject and the another subject; and
a processing unit that generates, from the first image, a second image in which the main subject and the another subject are illuminated with the virtual light using the parameters set by the setting unit,
wherein each unit is implemented by one or more processors, circuitry, or a combination thereof.

2. The image processing apparatus according to claim 1, wherein the extraction unit extracts, based on the distance information of the main subject, the another subject that exists within a predetermined range of a distance in the depth direction from a distance to the main subject in the depth direction.

3. The image processing apparatus according to claim 1, wherein in a case where no other subject is extracted by the extraction unit, (a) the setting unit sets the parameters of the one or more virtual light sources that emit the virtual light to the main subject, and (b) the processing unit generates the second image in which the main subject is illuminated with the virtual light.

4. The image processing apparatus according to claim 1, wherein the processing unit processes the first image based on (a) shapes of the main subject and the another subject, (b) the distance information, and (c) the parameters of the one or more virtual light sources to generate the second image in which the main subject and the another subject are illuminated with the virtual light by the one or more virtual light sources.

5. The image processing apparatus according to claim 1, wherein, in a case where a plurality of main subjects are detected by the detection unit, (a) the extraction unit extracts the another subject based on the distance information of each of the plurality of the main subjects, (b) the setting unit sets the parameters of the one or more virtual light sources that emit the virtual light to the main subject and the another subject with respect to each of the main subjects, and (c) the processing unit combines effects of the virtual light using the parameters on each of the main subjects.

6. The image processing apparatus according to claim 1, further comprising a selection unit that selects at least one of the main subject and the another subject,
   wherein the setting unit sets the parameters of one or more virtual light sources that emit virtual light to at least one of the main subject and the another subject as selected by the selection unit, and
   wherein the selection unit is implemented by one or more processors, circuitry, or a combination thereof.

7. The image processing apparatus according to claim 6, further comprising:
   a control unit that controls to superimpose a display indicating the main subject and the another subject on the first image on a display device; and
   an operation unit used for an operation to select the main subject and an operation to select the another subject, based on the display indicating the main subject and the another subject displayed on the display device,
   wherein the selection unit selects at least one of the main subject and the another subject in accordance with an operation of the operation unit, and
   wherein each of the control unit and the operation unit is implemented by one or more processors, circuitry, or a combination thereof.

8. The image processing apparatus according to claim 1, wherein the parameters of the one or more virtual light sources include (a) a position of each virtual light source, and (b) an illumination area and intensity of virtual light.

9. The image processing apparatus according to claim 1, wherein the parameters of the one or more virtual light sources include parameters of virtual light of one of a plurality of types including (a) addition light that increases brightness of a subject, (b) subtraction light that darkens a subject, and (c) specular reflection light.

10. The image processing apparatus according to claim 1, further comprising a second detection unit that detects a subject using a method different from a method used by the detection unit,
    wherein the extraction unit extracts the another subject based on (a) the distance information of the main subject and (b) distance information of the subject detected by the second detection unit, and
    wherein the second detection unit is implemented by one or more processors, circuitry, or a combination thereof.

11. An image processing method comprising:
    acquiring (a) a first image obtained through shooting and (b) distance information of the first image, wherein the distance information includes information on a distance to a subject in the first image in a depth direction;
    detecting a main subject from the first image;
    extracting another subject that exists in a predetermined region of the first image, the predetermined region being within a predetermined distance in the first image from the main subject, based on the distance information of the main subject;
    setting parameters of one or more virtual light sources that emit virtual light to the main subject and the another subject; and
    generating, from the first image, a second image in which the main subject and the another subject are illuminated with the virtual light using the parameters set by the setting.

12. A non-transitory computer-readable storage medium, the storage medium storing a program that is executable by a computer, wherein the program includes program code for causing the computer to function as an image processing apparatus comprising:
    an acquisition unit that acquires (a) a first image obtained through shooting and (b) distance information of the first image, wherein the distance information includes information on a distance to a subject in the first image in a depth direction;
    a detection unit that detects a main subject from the first image;
    an extraction unit that extracts another subject that exists in a predetermined region of the first image, the predetermined region being within a predetermined distance in the first image from the main subject, based on the distance information of the main subject;
    a setting unit that sets parameters of one or more virtual light sources that emit virtual light to the main subject and the another subject; and
    a processing unit that generates, from the first image, a second image in which the main subject and the another subject are illuminated with the virtual light using the parameters set by the setting unit.

* * * * *